(12) United States Patent
Samprathi et al.

(10) Patent No.: US 7,526,562 B1
(45) Date of Patent: Apr. 28, 2009

(54) STATEFUL IPV4-IPV6 DNS APPLICATION LEVEL GATEWAY FOR HANDLING TOPOLOGIES WITH COEXISTING IPV4-ONLY, IPV6-ONLY AND DUAL-STACK DEVICES

(75) Inventors: Ravikanth V. Samprathi, Santa Clara, CA (US); Bruce D. Moon, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 1442 days.

(21) Appl. No.: 10/411,698

(22) Filed: Apr. 11, 2003

(51) Int. Cl.
*G06F 15/16* (2006.01)
*H04J 3/16* (2006.01)
*H04J 3/22* (2006.01)
(52) U.S. Cl. .................. 709/230; 709/245; 370/466
(58) Field of Classification Search .......... 709/230, 709/245; 370/466
See application file for complete search history.

(56) References Cited

U.S. PATENT DOCUMENTS

| | | | |
|---|---|---|---|
| 5,937,169 A | | 8/1999 | Connery et al. |
| 6,118,784 A | * | 9/2000 | Tsuchiya et al. ............ 370/401 |
| 6,810,411 B1 | * | 10/2004 | Coughlin et al. ............ 709/203 |
| 7,085,270 B2 | * | 8/2006 | Inouchi et al. ............. 370/466 |
| 2004/0039798 A1 | * | 2/2004 | Hotz et al. ................. 709/219 |
| 2005/0160335 A1 | * | 7/2005 | Peterson .................... 714/724 |
| 2005/0223095 A1 | * | 10/2005 | Volz et al. .................. 709/225 |
| 2006/0112176 A1 | * | 5/2006 | Liu et al. ................... 709/223 |
| 2006/0146813 A1 | | 7/2006 | Biwas et al. |

OTHER PUBLICATIONS

G. Tsirtsis, et al., "Network Address Translation-Protocol Translation (NAT-PT)," Campio Communications, Feb. 2000, RFC 2766. pp. 1 to 20.
R. Gilligan, et al., "Transition Mechanisms for IPv6 Hosts and Routers", Sun Microsystems, Inc., Apr. 1996, RFC 1933. pp. 1-21.
R. Hinden, et al., "IP Version 6 Addressing Architecture", Cisco Systems, Jul. 1998, RFC 2373. pp. 1-25.
S. Deering, et al., "Internet Protocol, Version 6 (IPv6) Specification", Nokia, Dec. 1998. RFC 2460. pp. 1-37.
T. Narten, et al., "Neighbor Discovery for IP Version 6 (IPv6)", Daydreamer, Dec. 1998. RFC 2461. pp. 1-87.

(Continued)

*Primary Examiner*—Ario Etienne
*Assistant Examiner*—Avi Gold
(74) *Attorney, Agent, or Firm*—Weaver Austin Villeneuve & Sampson LLP

(57) ABSTRACT

Disclosed are methods and apparatus for efficiently and reliably handling DNS (domain name service) queries and responses. In general terms, mechanisms are provided for forwarding only one DNS response to a DNS client when two DNS responses having different protocols (IPv4 or IPv6) may be received, e.g., within a DNS handling device for a particular DNS query. The DNS handling device determines whether to forward or hold a first received DNS response based on a number of criteria. The DNS handling device also determines whether to forward a first or second received response to the DNS client when a first and second response for a particular query is received. In certain cases, a first received DNS response for a particular DNS query may be held until a second better response is received or a timer expires.

25 Claims, 12 Drawing Sheets

OTHER PUBLICATIONS

A. Conta, et al., "Internet Control Message Protocol (ICMPv6) for the Internet Protocol Version 6 (IPv6) Specification", Cisco Systems, Dec. 1998. RFC 2463. pp. 1-17.

P. Srisuresh, et al., "IP Network Address Translator (NAT) Terminology and Considerations", Lucent Technologies, Aug. 1999. RFC 2663. pp. 1-29.

P. Srisuresh, et al., DNS Extensions to Network Address Translator (DNS_ALG), Juniper Networks, Sep. 1999. RFC 2694. pp. 1-28.

E. Nordmark, et al., "Stateless IP/ICMP Translation Algorithm (SIIT)", Sun Microsystems, Feb. 2000. RFC 2765. pp. 1-25.

G. Tsirtsis, et al., "Network Address Translation-Protocol Translation (NAT-PT)," Campio Communications, Feb. 2000. RFC 2766. pp. 1-20.

K. Egevang, et al., "The IP Network Address Translator (NAT)", NTT, May 1994. RFC 1631. pp. 1-10.

Office Action mailed May 16, 2007, received in related U.S. Appl. No. 10/437,490.

G. Tsirtsis et al., RFC 2766 Network Address Translation—Protocol Translastion (NAT-PT), Feb. 2000, pp. 13-16.

Hitachi Ltd., Hitachi Gigabit Router GR2000 Series Enhanced Version, Release 06-05 (Feb. 2003), pp. 9-26 to 9-39.

Information Sciences Institute, "Transmission Control Protocol" RFC 793, pp. 16-16 and 24.

The Final Office Action mailed Dec. 10, 2007 for U.S. Appl. No. 10/437,490.

The Notice of Allowance mailed Apr. 18, 2008 for U.S. Appl. No. 10/437,490.

\* cited by examiner

STATEFUL IPV4-IPV6 DNS APPLICATION LEVEL GATEWAY FOR HANDLING TOPOLOGIES WITH COEXISTING IPV4-ONLY, IPV6-ONLY AND DUAL-STACK DEVICES

BACKGROUND OF THE INVENTION

The present invention relates to methods and apparatus for processing data within a computer network. More specifically, it relates to mechanisms for handling DNS (domain name system) requests and responses within a data network having IPv4 only devices, IPv6 only devices, and dual-stack devices.

For a particular computer to communicate with other computers or web servers within a network (e.g., the Internet), the particular computer must have a unique IP address. IP protocol version 4 specifies 32 bits for the IP address, which theoretically gives about 4,294,967,296 unique IP addresses. However, there are actually only between 3.2 and 3.3 billion available IP addresses since the addresses are separated into classes and set aside for multicasting, testing and other special uses. With the explosion of the Internet, the number of IP addresses is not enough to give each computer a unique IP address.

One solution for addressing computers with the limited number of IP addresses is referred to as network address translation (NAT). NAT allows an intermediary device (e.g., computer, router or switch) located between the Internet network and a local network to serve as an agent for a group of local computers. A small range of IP addresses or a single IP address is assigned to represent the group of local computers. Each computer within the local group is also given a local IP address that is only used within that local group. However, the group's local IP addresses may duplicate IP address that are used outside of the local network. When a local computer attempts to communicate with a computer outside the local network, the intermediary device matches the local computer's local IP address (and port) to one of the intermediary device's assigned IP addresses (and ports). The intermediary device then replaces the local computer's local address (and port) with the matched assigned IP address (and port). This matched assigned IP address (and port) is then used to communicate between the local computer and the outside computer. Thus, NAT techniques allow IP address to be duplicated across local networks.

Another solution to the lack of available IP addresses is to redesign the address format to allow for more possible IP addresses. The recent introduction of IPv6 provides 128 bits for the IP address, as compared with IPv4 which provides 32 bits for the IP address. However, until all network devices and computers are converted to IPv6, it is still necessary to allow an existing IPv4 device to communicate with an IPv6 device. One popular method that allows IPv4 to IPv6 communication is referred to as protocol translation (NAT-PT). The IP addresses are converted by NAT-PT from one protocol to another protocol (e.g., IPv4 to IPv6 or vice versa) or from an external protocol to an internal protocol (e.g., IPv4 to IPv4). In addition to the IP addresses, the NAT-PT also converts any relevant IPv4 or IPv6 information during a protocol translation.

A packet may also contain address(es) embedded in the payload that require translation. Particular applications may embed address(es) in the payload for various application specific purposes. The current approach for supporting applications which embed IP addresses in the payload (e.g., DNS (domain name system), FTP (file transfer protocol), H.225/ H.245) in a NAT environment is to add application-specific knowledge within the NAT device itself. This approach is described in detail in the Internet Engineering Task Force's Request for Comments document RFC 2663, entitled IP "Network Address Translator (NAT) Terminology and Considerations" by P. Srisuresh and M. Holdrege of Lucent Technologies (August 1999), which document is incorporated herein by reference in its entirety.

Name to address mappings are maintained by each DNS server. For instance, IP version 4 name to address mappings are held in "A" records, while IP version 6 name to address mappings are held in "AAAA" records. A particular domain name may have an IP version 4 address and/or an IP version 6 address mapping. An IP version 4 address includes 32 bits, while an IP version 6 address includes 128 bits.

FIG. 1 is a diagrammatic illustration of a conventional network 100. As shown, the network 100 includes a WAN (wide area network) network 110 and a LAN (local area network) network 114. The WAN 110 includes a DNS server 102 that is both IPv4-DNS-server and IPv6-DNS-server, a dual-stack (both IPv4 and IPv6 stacks) device 104, an IPv4-only device 106, and an IPv6-only device 108. The LAN network 114 consists of an IPv4-only device 118 and an IPv6-only device 116.

In order for these devices to use DNS names to communicate with each other, a router or a gateway 112, running NATPT (network address translation-port translation) and DNSALG (domain name system application level gateway), is needed in the path from one device to the other. The NATPT module in this router/gateway translates IPv4 packets to IPv6 and IPv6 packets to IPv4. The DNSALG module in the router/gateway snoops the DNS packet payloads, and translates IPv4 DNS query/response/inverse-query/inverse-response packets to IPv6 and translates IPv6 DNS query/response/inverse-query/inverse-response packets to IPv4.

The design of NATPT and DNSALG modules can be based on RFC 2766, "Network Address Translation-Protocol Translation (NAT-PT)," by Tsirtsis, G. and Srisuresh, P., February 2000, which is incorporated by reference in its entirety. Though RFC-2766's design of the NATPT module is complete, the DNSALG module is incomplete and does not work satisfactorily for the existing real-world network topologies.

RFC-2766's design of DNSALG addresses the network topologies which are IPv4-only and IPv6-only. This RFC does not have mechanisms for handling the situation where both IPv4-only devices and IPv6-only devices coexist in the same network. For example, consider the topology shown in FIG. 1, where both the networks LAN and WAN have both IPv4-only and IPv6-only devices. In this case, a network interface on the router/gateway 112 can receive both IPv4 and IPv6 packets. This situation is not handled by RFC-2766.

Additionally, if the router/gateway 112 is also used as a DNS server (IPv4 or IPv6), then the DNS queries have to be forwarded to this DNS server too, and the responses from this DNS server are not translated. For example, if the router/gateway 112 of FIG. 1 has both IPv4 and IPv6 DNS servers (actually the same DNS server can be configured to be both IPv4 and IPv6 servers), referred to as the IPv4+IPv6-DNS-server or IDS (Internal IPv4+IPv6 DNS server). The DNSALG does not forward translated queries to IDS and read the responses from IDS and translate the responses. In other words, this situation is not handled by RFC-2766.

According to RFC-2766, when an IPv4-only device wants to resolve the name of any device and if the query reaches DNSALG 112, the original IPv4 query is dropped. This is not a very efficient technique in the case where a dual-stack device exists in the network. For example, in FIG. 1, when IPv4 only device 118 of LAN 114 needs to resolve the name of dual stack device 104 of WAN 110, the IPv4 query reaches the DNSALG 112. The DNSALG 112 translates this to IPv6-DNS-query and drops the original IPv4-DNS-query. The DNSALG 112 then receives the IPv6-DNS-response which would contain the IPv6 address of dual stack device 104 of WAN 110. This IPv6 address will then be used to communicate between IPv4 only device 118 of LAN 114 and dual stack device 104 of WAN 110. Though the communication is possible through IPv4-IPv6 translations, the same communication could have been possible using the IPv4 address of dual stack device 104 of WAN 110. This would have eliminated the need and the time required for translation of every packet that could have just been fine without translation, had it used the IPv4 address of dual stack device 104 of WAN 110. This inefficiency becomes a potential problem when the number of connections is large, which creates bottlenecks for other packets and introduces unneeded delays in packet processing at the router/gateway.

A similar problem arises when a situation is considered where an IPv6-only device needs to communicate with a dual-stack device. For example, in FIG. 1, suppose the IPv6 only device 116 of LAN 114 needs to resolve the name of dual stack device 104 of WAN 110. The IPv6 only device 116 of LAN 114 ends up using the IPv4 address of dual stack device 104 of WAN 110, instead of the IPv6 address of the dual stack device 104 of WAN 110. This adds to the inefficiency in the design of DNSALG 112, thus increasing the packet processing times of other packets in the router/gateway.

Current DNS resolvers (in both IPv4 DNS clients and IPv6 DNS clients) work in the following way: A resolver sends a DNS-query on a port and wait for a response on the same port. When the resolver receives a response, it closes the port and does not listen to any further responses, meaning, the resolver listens to only the first response packet. If this first response packet has some answer records, then the resolver opens a data connection to the IP address specified in the answer records. But if this first response packet does not have any answer records, the resolver does not open any data connection. In this situation, where the first response packet has no answer records, even though a response packet with some answer records reaches the DNS-client after some time, the DNS-client will not be able to open a session. This behavior of DNS-clients is a potential problem when they interoperate with RFC-2766's DNSALG. According to RFC-2766, when an IPv6-only device wants to resolve the name of any device, the DNSALG should forward the original IPv6-DNS-query to IPv6-DNS-server and a translated-IPv4-DNS-query to the IPv4-DNS-server. If in FIG. 1, the IPv6 only device 116 of LAN 114 wants to resolve the name of any other device, then the DNSALG in router/gateway 112 forwards two queries to the DNS-server 102, one the original IPv6-DNS-query and second the translated-IPv4-DNS-query. This is a potential problem in two situations.

In a first case, the IPv6 only device 116 of LAN 114 wants to resolve the name of an IPv4-only device, like the IPv4 only device 106 of WAN 110. The DNSALG 112 forwards both IPv6-AAAA query and the IPv4-A query to the DNS-server(s) 102. Since the IPv4 only device 106 of WAN 110 is an IPv4-only-device, the IPv4-DNS-response would have the actual IPv4 address of the IPv4 only device 106 of WAN 110, and the IPv6-DNS-response would have zero answer records. If this IPv6-DNS-response, which has zero answer records, reaches the DNSALG 112 first, then this zero record response is forwarded to IPv6 only device 116 of LAN 114. The resolver-client in IPv6 only device 116 of LAN 114 realizes that there are no answer records in the response and thus does not try to establish a connection with the IPv4 only device 106 of WAN 110. After some time, the translated IPv4-DNS-response reaches IPv6 only device 116 of LAN 114, but this response is ignored by the resolver-client. This defeats the whole purpose of DNSALG to resolve names. Due to a difference in the timings at which the responses arrived at DNSALG 112, the establishment of the IPv6-to-IPv4 connection was not possible.

In a second situation, the IPv6 only device 116 of LAN 114 needs to resolve the name of an IPv6-only device, like the IPv6 only device 108 of WAN 110. In a specific situation, the translated IPv4-response with NULL answer records reaches the DNSALG 112 first. The DNSALG 112 translates this response to IPv6 and forwards it to IPv6 only device 116 of LAN 114. The actual IPv6 response with a valid answer record reaches the IPv6 only device 116 of LAN 114 after some time. This is ignored by the resolver client in IPv6 only device 116 of LAN 114. This handling specified by RFC 2766 again defeats the whole purpose of DNSALG.

In view of the above, there is a need for improved mechanisms for more efficiently and reliably processing DNS queries and responses.

SUMMARY OF THE INVENTION

Accordingly, the present invention provides methods and apparatus for efficiently and reliably handling DNS (domain name service) queries and responses. In general terms, mechanisms are provided for forwarding only one DNS response to a DNS client when two DNS responses having different protocols (IPv4 or IPv6) may be received, e.g., within a DNS handling device for a particular DNS query. The DNS handling device determines whether to forward or hold a first received DNS response based on a number of criteria. The DNS handling device also determines whether to forward a first or second received response to the DNS client when a first and second response for a particular query is received. In certain cases, a first received DNS response for a particular DNS query may be held until a second better response is received or a timer expires.

In one embodiment, a method for handling domain name system (DNS) packets is disclosed. A current DNS response is received, and such current DNS response corresponds to a first DNS query that was earlier received and sent by a DNS client or a second DNS query that is a translation of the first DNS query. The current DNS response has a first IPv4 or IPv6 protocol. It is then determined whether to forward the current DNS response to the DNS client, discard the current DNS response, or hold the current DNS response and wait for a second DNS response corresponding to the first DNS query. The second DNS response has a second IPv4 or IPv6 protocol that differs from the first IPv4 or IPv6 protocol of the current DNS response. The determination as to whether to forward or hold the current response is based on whether the current DNS response has a null answer record, whether the current response is a first received response for the first DNS query or a second DNS query that is a translation of the first DNS query, whether the current DNS response requires translation from the first to the second protocol, and whether the second DNS response is received within a predetermined period of time after receipt of the first DNS query. After the determination is complete, the current DNS response is handled based on such determination.

In a further aspect, the particular DNS query has an IPv4 or an IPv6 first protocol, and the method further includes (1) when the first protocol of the first DNS query is IPv4, translating the first DNS query into a second DNS query having a second protocol that is IPv6 and forwarding the first DNS query having the IPv4 first protocol to an IPv4 DNS server and the second DNS query having the IPv6 protocol to an IPv6 DNS server; and (2) when the first protocol of the first DNS query is IPv6, translating the first DNS query into a second DNS query having a second protocol that is IPv4 and forwarding the first DNS query having the IPv6 first protocol to an IPv6 DNS server and the second DNS query having the IPv4 protocol to an IPv4 DNS server.

In a specific implementation, determining whether to forward and determining whether to hold the current DNS response includes (a) when the current DNS response (i) requires translation, (ii) contains a null record answer, and (iii) is the first received response, determining to hold the current DNS response until the predetermined time period expires; and (b) when the current DNS response is held as a first DNS response and the predetermined time period expires, determining to forward the current DNS response to the first device. In a further embodiment, determining whether to forward or hold the current DNS response includes (c) when the current DNS response is held as a first DNS response and a second DNS response (i) is received, (ii) requires translation, and (iii) contains a null record, determining to forward the first DNS response to the DNS client; and (d) when the current DNS response is held as a first DNS response and a second DNS response is (i) received, (ii) requires translation, and (iii) does not contain a null record, translating the second DNS response and forwarding the translated second DNS response to the DNS client.

In yet a further aspect, determining whether to forward or hold the current DNS response further includes determining to forwarding the current DNS response to the DNS client when the current DNS response does not contain a null record and does not require translation. In a further aspect, when the current DNS response requires translation and is the first received response, it is determined to hold the current DNS response.

In another implementation, when the current DNS response is held as a first DNS response and a second DNS response (i) is received, (ii) does not require translation, (iii) contains a null record, and (iv) the first response contains a null record, the second DNS response is forwarded to the DNS client. When the current DNS response is held as a first DNS response and a second DNS response (i) is received, (ii) does not require translation, (iii) contains a null record, and (iv) the first response does not contain a null record, the first DNS response is translated and the translated first DNS response is forwarded to the DNS client.

In a further aspect, the first protocol of the current DNS response is translated into the second protocol prior to forwarding it to the DNS client when it requires translation and the second protocol of the second response is translated prior to forwarding it to the DNS client when it requires translation. In a specific embodiment, an entry is stored within a connection table for the first DNS query, and the entry for the first DNS query includes an identifier for the first DNS query and a field for holding the first received response. When the current response is received, it is determined whether the entry for the first DNS query is still present based on an identifier of the current response matching the identifier of the entry. The current response is dropped when the entry for the first DNS query is not present. In one aspect, the identifier of the entry includes an IP source address, DNS query identifier, and source port value from the first DNS query, and the identifier of the current response includes an IP destination address, DNS response identifier, and destination port of the current DNS response. In one implementation, the current DNS response requires translation when its first protocol differs from a protocol of the IP source address of the connection table entry for the first DNS query. In yet another aspect, the connection table entry for the first DNS query also includes a timer that is initiated upon creation of the entry, and wherein expiration of the predetermined period of time is an expiration of the timer of the connection table entry. In a final aspect, the connection table entry is flushed when the current or second DNS response is forwarded to the DNS client or the predetermined period of time expires.

In another embodiment, the invention pertains to a computer system operable to handle domain name system (DNS) packets. The computer system includes one or more processors and one or more memory. At least one of the memory and processors are adapted to provide at least some of the above described method operations. In yet a further embodiment, the invention pertains to a computer program product for handling domain name system (DNS) packets. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general terms, the present invention provides mechanisms for a Stateful-DNSALG (domain name system application level gateway) or SDNSALG. This Stateful-DNSALG receives DNS query packets, translates them, and maintains information regarding the DNS query. In one implementation, a connection entry is created within a data structure for each DNS query session. On receiving a DNS response packet for a particular DNS query-session, the Stateful-DNSALG (also referred herein as a Stateful-DNS or simply a DNS device) decides if it has to wait for further response, if it has to send this response back to the DNS-client, or if it has to discard this response. This decision is based on several factors, such as which response is received first, and whether the first response is a null record response, and the length of time it takes to receive a second response. Ideally, a response which contains a non-null answer record is forwarded to the DNS client unless such response takes an inordinate amount of time to reach the Stateful-DNS. This decision ensures that the best DNS response packet is sent back to the DNS client. This behavior of the Stateful-DNSALG makes it stateful and provides an efficient and reliable mechanism for handling DNS packets.

Figure 1:
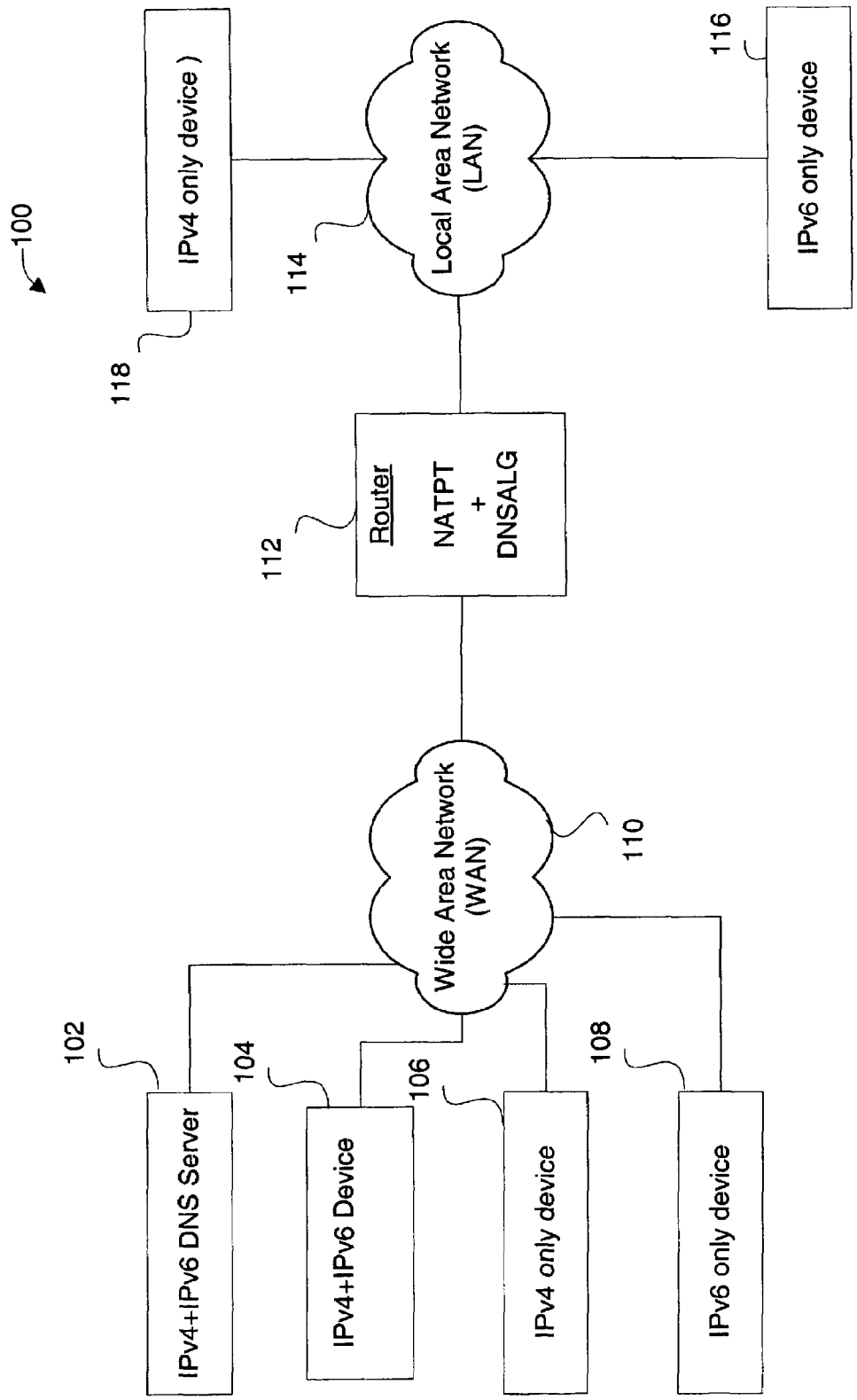
FIG. 1 is a diagrammatic representation of a computer network.
Figure 2:
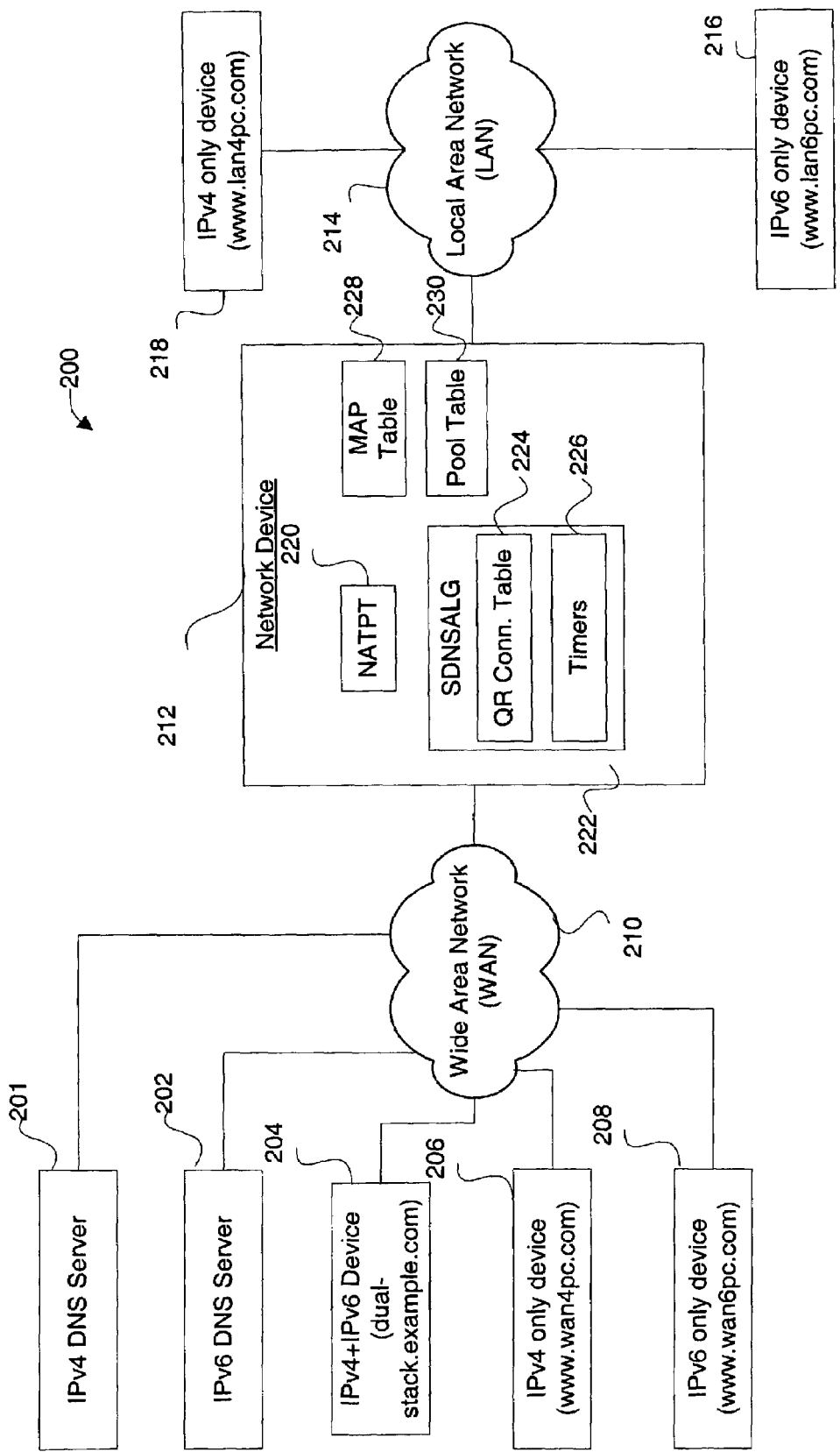
FIG. 2 is a diagrammatic representation of a network in which techniques of the present invention may be implemented in accordance with one embodiment of the present invention.

FIG. 2 is a diagrammatic representation of a network 200 in which techniques of the present invention may be implemented in accordance with one embodiment of the present invention. The devices of this network 200 will be utilized herein to illustrate techniques of the present invention. As shown, the network 200 includes a LAN network 214 and a WAN network 210 coupled through a network device 212. The network device 212 includes several blocks which may be implemented separately or within a same device. The network device 212 generally includes a NAT-PT (network address translation and protocol translation) device 220 and a Stateful-DNSALG or Stateful-DNS 222. The NAT-PT is operable to translate between different network addresses, ports, and protocols as represented within the data packets traveling through the network device 212. The Stateful-DNS 222 is generally operable to handle DNS query and response packets traveling through or to the network device 212.

In the illustrated embodiment of FIG. 2, the WAN network 210 includes an IPv4 only device 206, an IPv6 only device 208, a dual-stack device 204, an IPv4 DNS server 202, and an IPv6 DNS server 204. As shown, LAN 214 includes an IPv4 only device 218 and an IPv6 only device 216. Of course, the WAN 210 or LAN 214 may include any number and type of network elements, routers, NAT or NAT-PT devices, S-DNSALG devices, clients, servers, and devices. Additionally, a single IPv4/IPv6 DNS server may be utilized to handle both IPv4 and IPv6 requests. Each DNS server may also be located anywhere else within the network 200, such as within network device 212, coupled directly with network device 212, or within LAN network 214. There may be any suitable number of DNS servers within WAN 210 and/or LAN network 214. There may be any suitable number and type of NAT-PT devices within WAN network 210 and/or LAN network 214.

The NAT-PT 220 and Stateful-DNS 222 may utilize any suitable number and type of data structures for facilitating their operations as described herein. In one embodiment, the Stateful-DNS 222 includes a query-response (QR) connection table 224 (also referred herein as a connection table) for tracking DNS query and corresponding response connections and timers 226 for limiting particular DNS handling actions to be performed within predefined time limits before implementing an alternative action as described further below. The NAT-PT 220 and/or Stateful-DNS 222 may also share an address pool table 228 having available translation addresses for the LAN 214 and a map table 230 for tracking bindings between private and public address. These data structures of FIG. 2, as well as additional or alternative structures, are described further below in the context of the stateful-DNS handling techniques of the present invention.

Figure 3A:
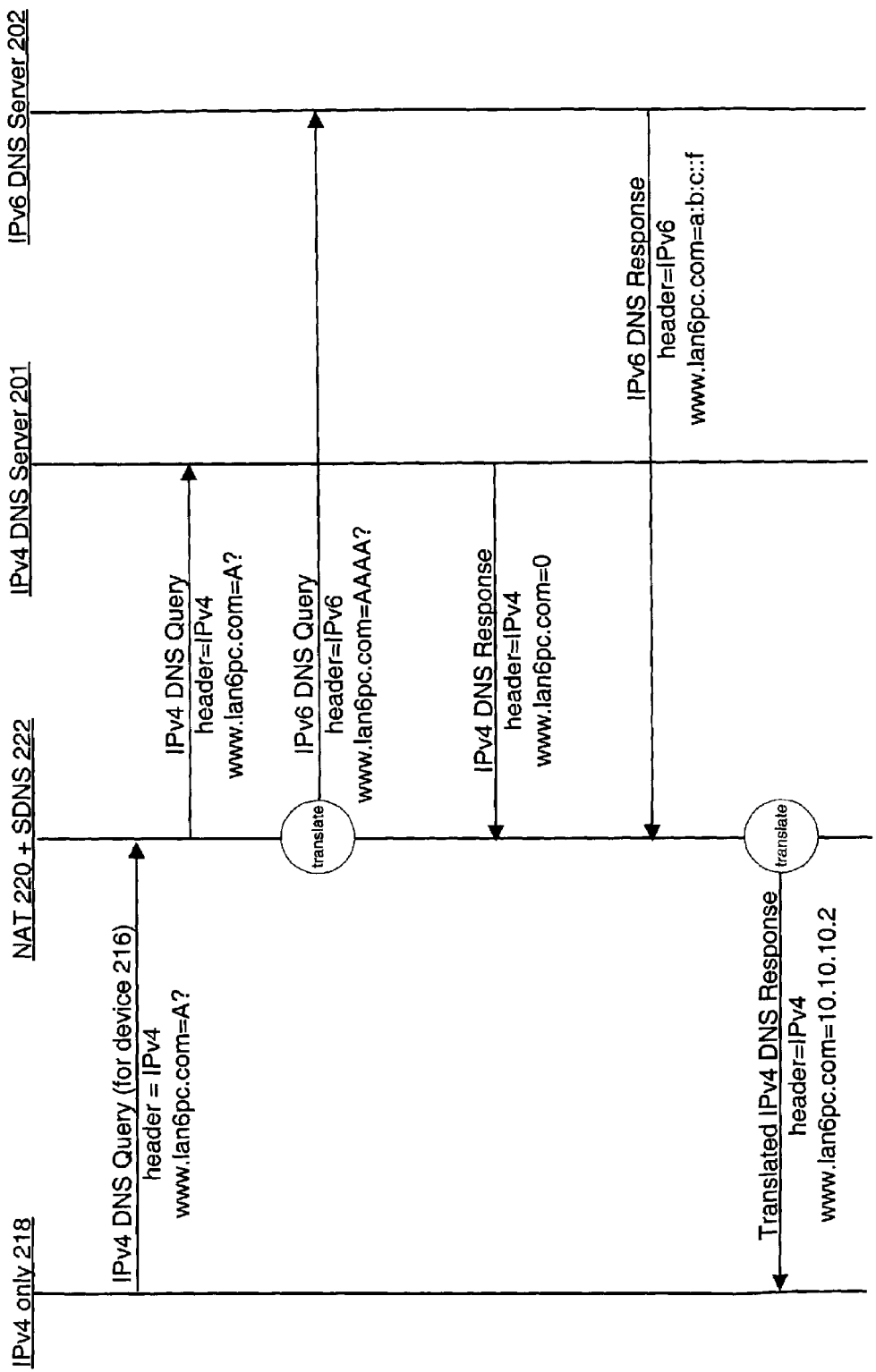
FIG. 3A is a communication diagram in which IPv4 only device sends a DNS query for the address of IPv6 only device in accordance with one embodiment of the present invention.

FIG. 3A is a communication diagram in which IPv4 only device 218 sends a DNS query for the address of IPv6 only device 216 in accordance with one embodiment of the present invention. In this example, both devices 218 and 216 are within the same LAN 214. Initially, IPv4 device 218 sends a DNS query to network device 212. The DNS query initially has an IPv4 header and a query within the payload having the format "www.lan6 pc.com=A?", where the 32 bit address A of IPv6 device 216 is requested.

Although the DNS query may initially go to NAT device 220 within the network device 214, the NAT device 220 is preferably configured to send all DNS queries, as well as DNS responses, to the Stateful-DNS device 222. This configuration may be accomplished in any suitable manner. In one implementation, the Stateful-DNS 222 registers itself with the NAT device 220, and the NAT device 220 then adds the Stateful-DNS 222 to its ALG table which contains entry points for devices which handle specific applications. In this case, the ALG table contains an entry point for the Stateful-DNS 222, and this entry point is also associated with a source and destination port value equal to 53, which correspond to a DNS query or response. Thus, when the NAT device 220 receives a packet having a source or destination port having a 53 value, it forwards such packet to the Stateful-DNS 222 via the registered entry point. In contrast, packets which do not contain a source or destination port value of 53 are not forwarded to the Stateful-DNS 222.

After the Stateful-DNS 222 receives the DNS query, it sends the IPv4 DNS query to the IPv4 DNS server, 201. The Stateful-DNS 222 also forms a translated IPv6 DNS query from the IPv4 DNS query and forwards the IPv6 DNS query to the IPv6 DNS server 202. The IPv4 DNS server 201 may then respond to the IPv4 query with an IPv4 DNS response having an IPv4 header and a zero record answer. The answer may contain a zero record when there is no matching record for the query, e.g., www.lan6 pc.com. In contrast, the IPv6 DNS server 202 may respond to the IPv6 with an IPv6 DNS response having an IPv6 header as well as an IPv6 answer address. The answer may be in the form of "www.lan6 pc.com=a:b:c::f", where a:b:c::f is the 128 bit address of the IPv6 device 216. If the Stateful-DNS 222 receives both DNS responses within a predefined time period, the Stateful-DNS 222 translates the IPv6 DNS response into an IPv4 DNS response and only forwards the translated IPv4 DNS response to the DNS client (e.g. IPv4 only device 218).

Figure 3B:
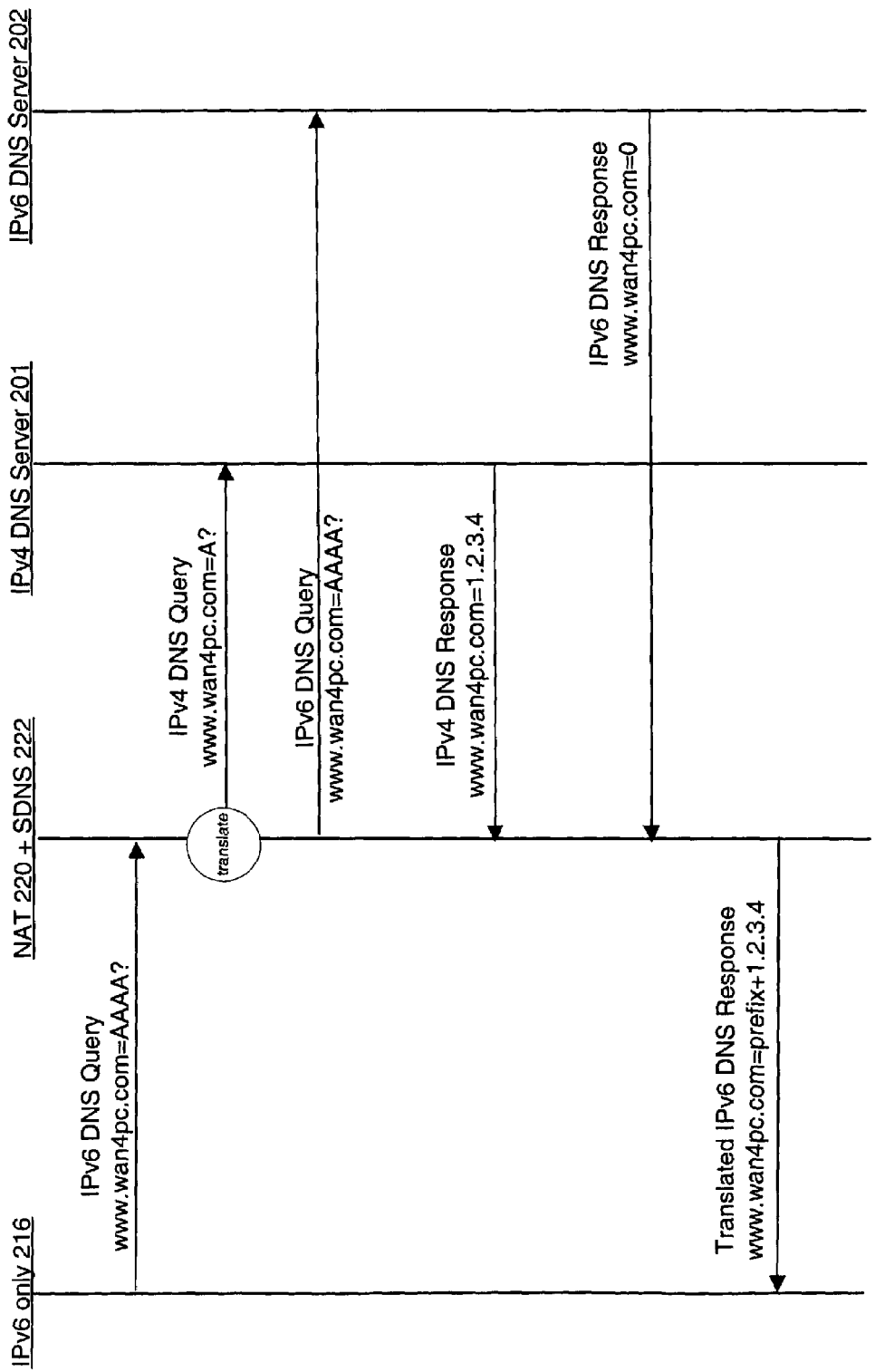
FIG. 3B is a communication diagram illustrating the IPv6 only device within LAN sending a DNS query for the IPv4 device within WAN in accordance with one embodiment of the present invention.

FIG. 3B is a communication diagram illustrating the IPv6 only device 216 within LAN 214 sending a DNS query for the IPv4 device within WAN 110 in accordance with one embodiment of the present invention. Initially, an IPv6 DNS query for IPv4 only device 206 in the form of "www.wan4 pc.com=AAAA?" is sent to NAT device 220 and Stateful-DNS 222, where the 128 bit AAAA address of IPv4 device 206 is requested. The IPv6 DNS query is sent to IPv6 DNS server 202. The IPv6 DNS query is also translated into an IPv4 DNS query and sent to IPv4 DNS server 201. The IPv4 DNS server 201 sends an IPv4 DNS response with an answer IPv4 address in the form of 1.2.3.4 to the Stateful-DNS 222. The IPv6 DNS server 202 sends an IPv6 DNS response with a null record to the Stateful-DNS 222. If the IPv4 response is received within a predefined time period, the Stateful-DNS 222 translates the IPv4 DNS response into an translated IPv6 DNS response and forwards this translated response to the IPv6 device 216.

Figure 4:
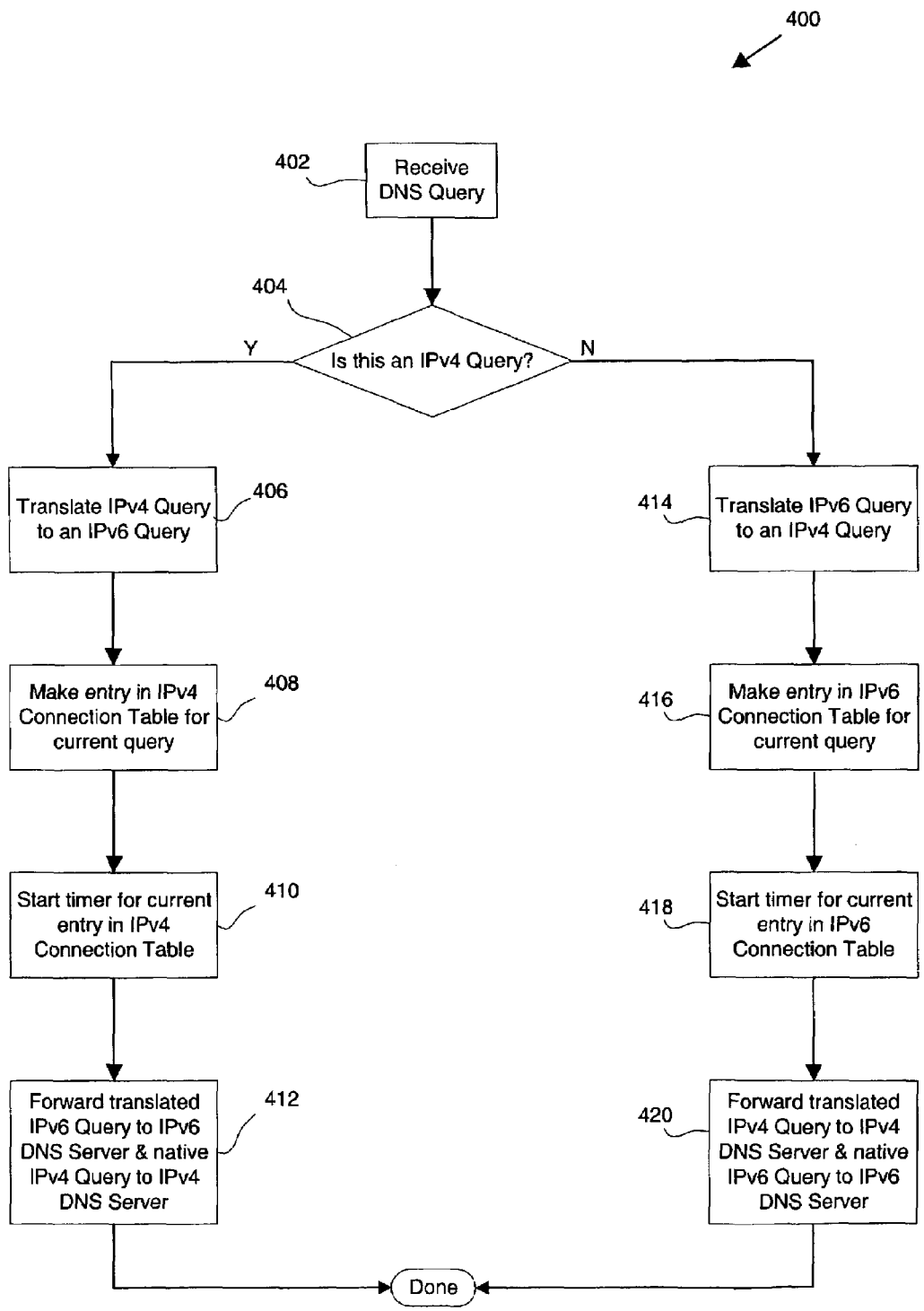
FIG. 4 is a flowchart illustrating a procedure for handling a DNS query, e.g., within the Stateful-DNS device in accordance with a specific embodiment of the present invention.

FIG. 4 is a flowchart illustrating a procedure 400 for handling a DNS query, e.g., within the Stateful-DNS device 222 in accordance with a specific embodiment of the present invention. Initially, a DNS query is received in operation 402. It is then determined whether this is an IPv4 query in operation 404. If it is an IPv4 query (as illustrated in FIG. 3A), the IPv4 query is translated to a IPv6 query in operation 406. An entry is also made in an IPv4 connection table for the current query in operation 408. A timer for the current entry within the IPv4 connection table is then started in operation 410. The translated IPv6 query is forwarded to the IPv6 DNS server and the native IPv4 query is forwarded to the IPv4 DNS server in operation 412.

If the DNS query is not an IPv4 query or rather it is an IPv6 query (as illustrated in FIG. 3B), the IPv6 query is translated to an IPv4 query in operation 414. The entry is also made in an IPv6 connection table for the current query in operation 416. A timer is also started for the current entry within the IPv6 connection table in operation 418. The translated IPv4 query is forwarded to the IPv4 DNS server and the native IPv6 query is forwarded to the IPv6 DNS server in operation 420. The procedure for the handling of the DNS query then ends.

Figure 5A:
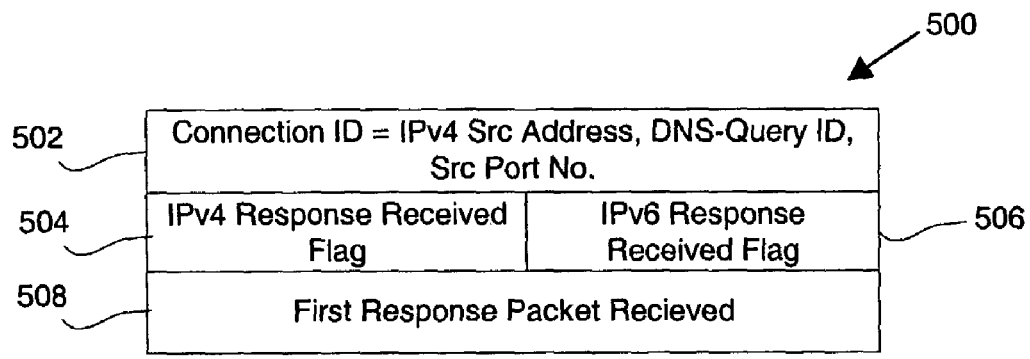
FIGS. 5A and 5B are diagrammatic representations of an IPv4 connection table and an IPv6 connection table, respectively, in accordance with one embodiment of the present invention.
Figure 5B:
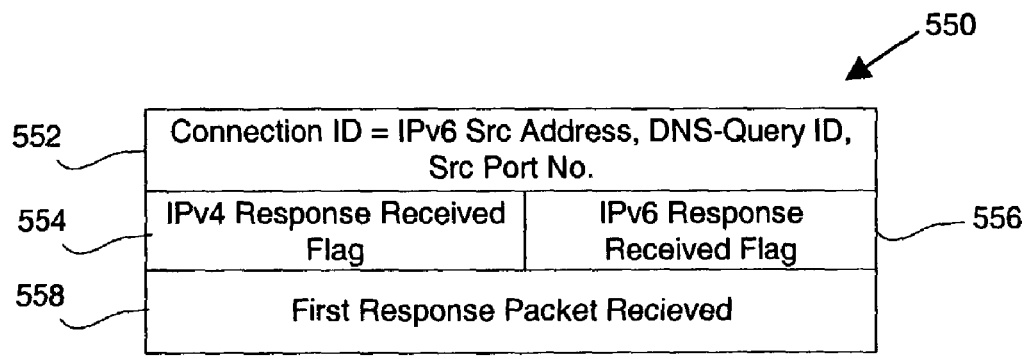

FIGS. 5A and 5B are diagrammatic representations of an IPv4 connection table 500 and an IPv6 connection table 550, respectively, in accordance with one embodiment of the present invention. In general terms the IPv4 connection table provides a mechanism for tracking IPv4 DNS queries and corresponding responses, while the IPv6 provides mechanism for tracking IPv6 DNS queries and corresponding responses. An entry is made in the corresponding table for each DNS query received by the Stateful-DNS 222. For each entry, the IPv4 connection table 500 includes a connection ID 502, an IPv4 response received flag 504, an IPv6 response received flag 506, and a first response packet received field 508.

The connection ID generally provides a mechanism for identify a DNS response and query as belonging to the same connection. In one implementation, the connection ID for a particular entry includes the following information from a particular IPv4 query: IPv4 source address, DNS query identifier, and source port value. For each entry or particular IPv4 query, the IPv4 response flag 504 indicates whether an IPv4 response has been received, while the IPv6 response received flag 506 indicates whether an IPv6 response has been received. Although these flags are optional, they may be used to expedite a determination as to whether a particular response type has been received for a corresponding connection. The first response received field 508 may be used for storing the first response received for such connection.

The IPv6 connection table 550 has similar fields. For each entry or connection, the IPv6 connection table 550 includes a connection ID 552, an IPv4 response received flag 554, an IPv6 response received flag 556, and a first response packet received field 558. As further described below, a timer may also be initiated for each entry as it is created (when a DNS query is received). The timer may be set to any suitable predefined time limit for receiving a DNS response. For example, the timer may be set to a value between about 40 and 65,535 seconds. The minimum value may depend on any suitable factor. For example, the 40 second minimum corresponds to the TCP timer value. The maximum value of 65,535 seconds is determined by the 16 bit length of the timer register. Of course, a differently sized register would have a different maximum timer value. A timer value of 3600 seconds has been found to work well.

Figure 6A:
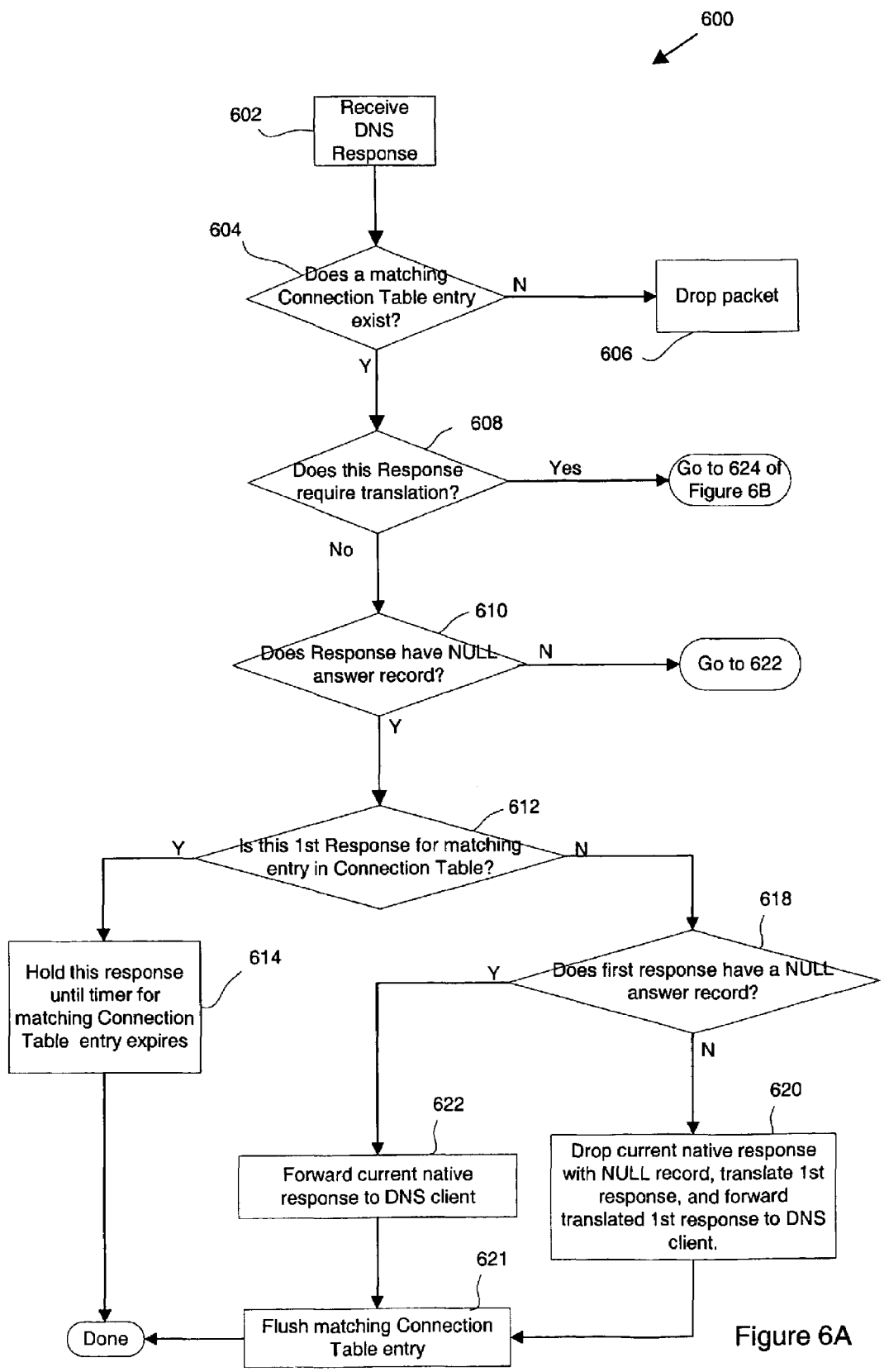
FIGS. 6A and 6B show a flowchart illustrating a procedure for handling a DNS response, e.g., within the Stateful-DNS, in accordance with one embodiment of the present invention.
Figure 6B:
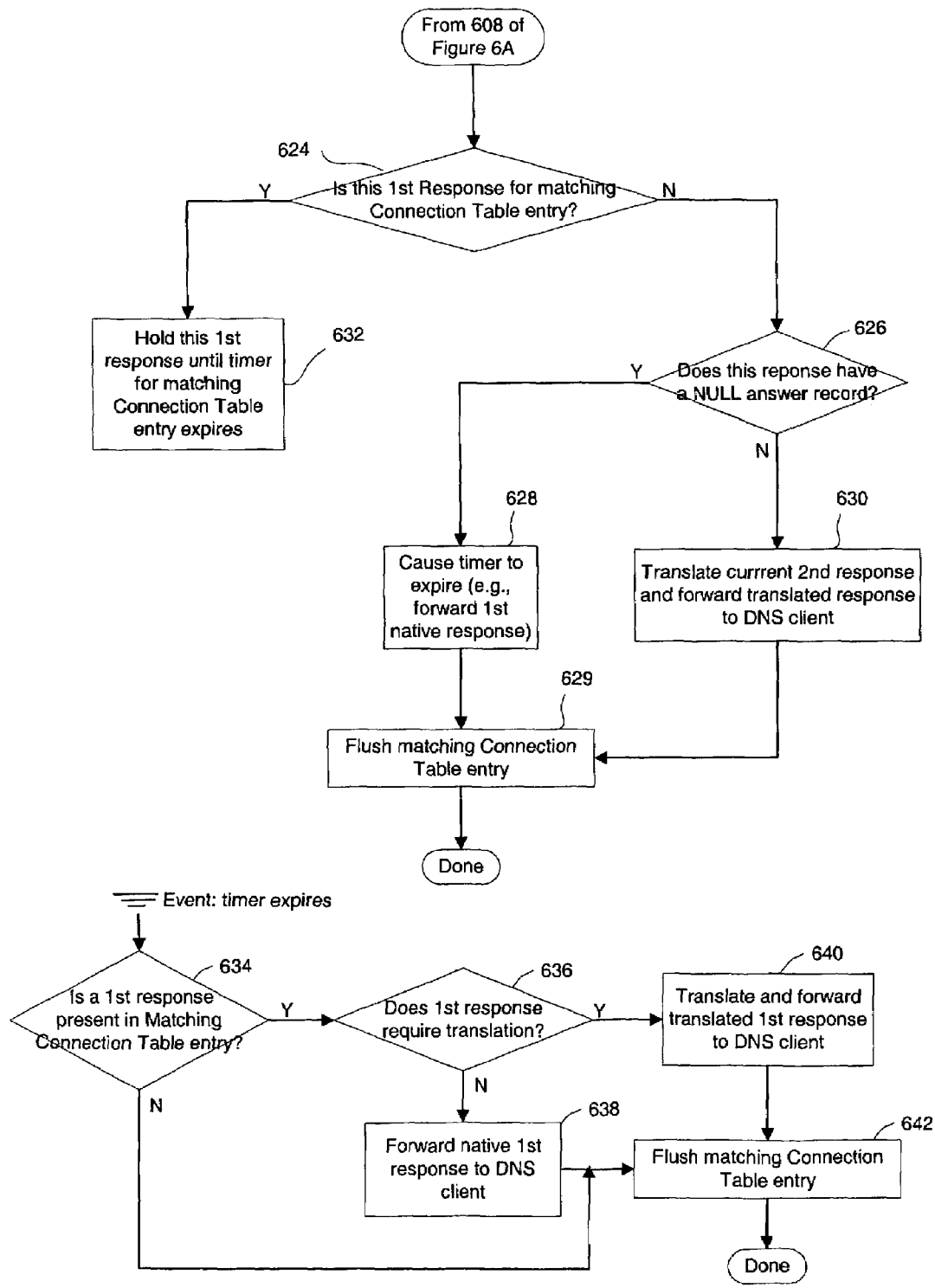

FIGS. 6A and 6B show a flowchart illustrating a procedure 600 for handling a DNS response, e.g., within the Stateful-DNS 222, in accordance with one embodiment of the present invention. Initially, a DNS response is received in operation 602. It is then determined whether a matching connection table entry exists in operation 604. For example, the IPv4 connection table 500 and the IPv6 connection table of FIGS. 5A and 5B are checked to determine whether an entry has a same connection ID as the received DNS response. If no matching entry exists, the response is dropped in operation 606.

If there is a matching connection table entry, it is then determined whether this response requires translation in operation 608. For instance, when the response corresponds to an IPv4 connection table entry, it is determined whether the response is an IPv4 response. If it is not an IPv4 response, then the response requires translation. Likewise, when the response corresponds to an IPv6 connection table entry, it may be determined whether the response is an IPv6 packet. If not, then the response requires translation. In the example of FIG. 3A, when the IPv4 query was initially sent by IPv4 only device 218, an IPv4 connection table entry was created. Thus, if an IPv6 response is received, it is then determined that the response requires translation. If an IPv4 response is received, it is determined that the response does not require translation and is referred to as a "native" response. In the example of FIG. 3B, when the IPv6 query was initially sent by IPv6 only device 216, an IPv6 connection table entry was created. Thus, if an IPv4 response is received, it is then determined that the response requires translation. If an IPv6 response is received, it is determined that the "native" response does not require translation. Note that both types of responses will likely be eventually received by the Stateful-DNS although probably not at the same time.

If the currently received response does not require translation, it is then determined whether this response has a null answer record in operation 610. If the first response does not have a null record, this native response is forwarded to the DNS client in operation 622 and the matching connection table entry is flushed in operation 621. The DNS response handling routine for the current response then ends. When the packet does not require translation and it contains an answer record for an address that does not require translation, it is determined that the native response is the best option for forwarding to the DNS client. The native response is chosen over a response that requires translation to increase efficiency and reduce processing overhead, e.g., when the DNS client wishes to communicate with a dual-stack device. Even if, a second response were to be received into the Stateful-DNS, it would require translation of the answer record before forwarding it to the DNS client. Additionally, if such translated response were forwarded to the DNS client, data packets transmitted thereafter between the DNS client and the dual-stack device would then each require translation resulting in significant processing overhead. When the device with which the DNS client wishes to communicate is a dual-stack device capable of using both an IPv4 and IPv6 address (e.g., for different applications), an appropriate protocol for the address of the dual-stack device can then be utilized for communication, e.g., the IPv4 address of the dual stack device is used to communicate with an IPv4 device and the IPv6 address of the dual stack device is utilized for communication with an IPv6 device.

If the currently received response has an answer record that equals null, it is then determined whether this is the first response for this matching entry in the corresponding connection table in operation 612. That is, it is determined whether this is the first DNS response received for the corresponding DNS query. A null record may be present in a response when the DNS query was asking for an address having a protocol that does not match the protocol of the desired device's address. For the example of FIG. 3A where IPv4 only device 218 sends a DNS query for the address of IPv6 only device 216, the IPv4 response from the IPv4 DNS server 201 (in response to the IPv4 query) will have a null answer record. For the example of FIG. 3B where IPv6 only device 216 sends a DNS query for the address of IPv4 only device 206, the IPv6 response from the IPv6 DNS server 202 (in response to the IPv6 query) will have a null answer record.

When a null record response is received, it may be determined whether this response is the first response in any suitable manner. In one implementation, when a first response is received, it is stored within the corresponding connection table entry, e.g., within the "first response packet received" field 508 of FIG. 5A. This field may then be examined to determine whether a first response has been stored therein. If a response has already been stored, then it is determined that the current response is not the first response. In contrast, it is determined that the current response is a first response when the "first response packet received" field within the corresponding connection table entry is empty.

If this is a first response, this response is then held (e.g., within the "first response packet received" field of the matching connection table entry) until the timer for the matching connection table entry expires in operation 614. Referring to FIG. 6B, if the timer expires, it is determined whether a first response for the matching connection table entry is present in operation 634. If a first response does not exist, the matching entry is simply flushed and no further action occurs. In this case, a response has failed to arrive in the predefined time limit for this connection. If a first response is present, it is then determined whether the first response requires translation in operation 636. If the first response requires no translation, the first native response is then forwarded to the DNS client in operation 638. If the first response requires translation, the first response is translated and the translated first response is then forwarded to the DNS client in operation 642. The matching connection table entry is then flushed in operation 642.

For the example of FIG. 3A where IPv4 only device 218 sends a DNS query for the address of IPv6 only device 216, if the IPv4 native response with a null-record is received first and the IPv4 response is not received before expiration of the corresponding connection entry timer, the IPv4 native response having a zero record is forwarded to the DNS client. For the example of FIG. 3B where IPv6 only device 216 sends a DNS query for the address of IPv4 only device 206, if the IPv6 native response with a null record is received first and the IPv4 response is not received before expiration of the corresponding connection entry timer, the IPv6 native response having a zero record is forwarded to the DNS client. Alternatively, when the first response does not require translation and is a null answer record and the timer has expired without receipt of a second response, the matching connection entry may simply be flushed with no further action (e.g., forwarding of a null-record response).

Referring back to FIG. 6A, if this is not the first response for the matching entry, it is then determined whether the first response has a null record in operation 618. If the first response has a null record, this native response, which also has a null record, is forwarded to the DNS client in operation 622. In other words, when both responses are null, the native response is preferably forwarded to reduce translation overhead. Alternatively, the matching connection entry may simply be flushed with no further action (e.g., such as not forwarding of a null-record response). If the first response does not have a null record, the current response is dropped, the first response is translated, and this translated first response is then forwarded to the DNS client in operation 620.

For the example of FIG. 3A where IPv4 only device 218 sends a DNS query for the address of IPv6 only device 216, if the IPv6 response (which requires translation) is received first, it is held until the native IPv4 response is received. After a native IPv4 response having the null record is received, it is dropped and the IPv6 response is translated and sent to the DNS client in operation 620. For the example of FIG. 3B where IPv6 only device 216 sends a DNS query for the address of IPv4 only device 206, if the IPv4 response (which requires translation) is received first, it is held until the native IPv6 response is received. After a native IPv4 response having the null record is received, it is dropped and the IPv4 response is translated and sent to the DNS client in operation 620.

Referring to FIG. 6B, when this response requires translation, it is then determined whether this is the first response for the matching connection table entry in operation 624. If this is the first response, this response is held until the timer for the matching connection table entry expires in operation 632. In other words, when the response requires translation it is held whether it has a null value or a non-null answer record. If the timer expires, the operations for a timer expiration event are performed as described above (e.g., operation 634 through 642 of FIG. 6B) and the first response is translated and forward to the DNS client.

If this is not the first response for the matching connection table entry, it is then determined whether this response has a null answer record in operation 626. If this response does not have a null answer record, the current response is translated and forwarded to the DNS client in operation 628 and the matching connection table entry is flushed in operation 629. If this response has a null answer record, the timer is caused to expire in operation 630 so as to initiate timer expiration events (e.g., native first response is sent to the DNS client). For the example of FIG. 3A, when the native IPv4 response having a null record is received first, it is held. When the IPv6 response (which requires translation) having a non-null answer record is then received, it is translated and sent to the DNS client. For the example of FIG. 3B, when the native IPv6 response having a null record is received first, it is held. When the IPv4 response (which requires translation) having a non-null answer record is then received, it is translated and sent to the DNS client. In both examples, when two responses having a null record are received, the native response is forwarded to the DNS client to reduce translation overhead.

Figure 7A:
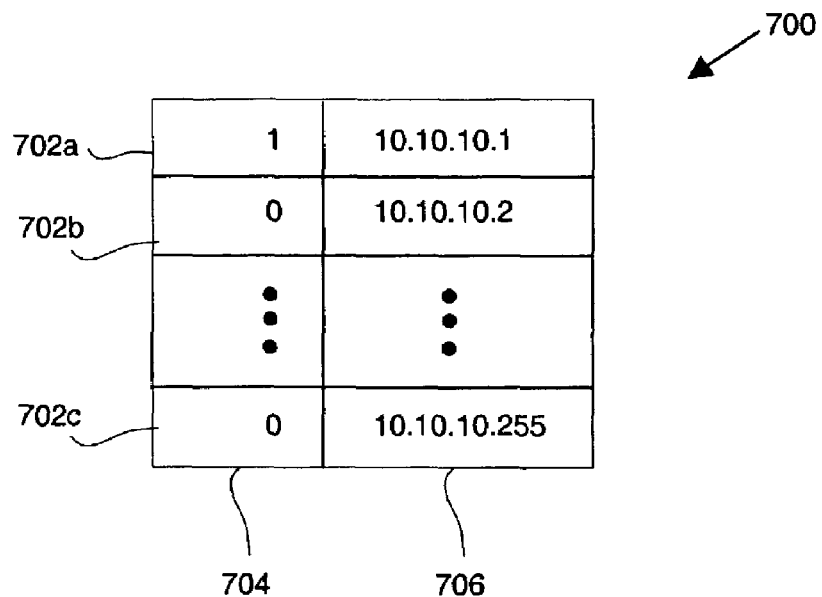
FIG. 7A is a diagrammatic representation of a pool table in accordance with one embodiment of the present invention.

Translation of the IP headers and DNS answer address may be performed using any conventional address and protocol translation techniques. In one embodiment, a pool table of available translation addresses and a prefix for translating between protocols may be pre-configured within the network device 212. FIG. 7A is a diagrammatic representation of a pool table 700 in accordance with one embodiment of the present invention. The pool table includes a pool of addresses available to the NAT-PT 220 and Stateful-DNS 222 which may be used for translating an IP address or DNS answer address. As shown, the pool table 700 includes a plurality of entries 702a through 702c. Each entry 702 includes a pool address 706 and a use field 704 that indicates whether the corresponding address is in use. In the illustrated example, entry 702a includes pool address 10.10.10.1 and its use field is set to one. In this example, a one indicates that the address 10.10.10.1 is in use. In contrast, the entry 702b has a pool address 10.10.10.2 and a use flag set to zero which indicates that such address is not in use.

In the example of FIG. 3A, when the IPv6 DNS response having an answer record equal to a:b:c::f is received, an available IPv4 address from the pool table is substituted for the IPv6 answer address. In this case, the answer IPv6 address a:b:c::f is translated into an IPv4 address 10.10.10.2. The binding between the IPv6 and matching IPv4 pool addresses are then tracked to be used later during data communication between IPv4 only device 218 and IPv6 only device 216.

Figure 7B:
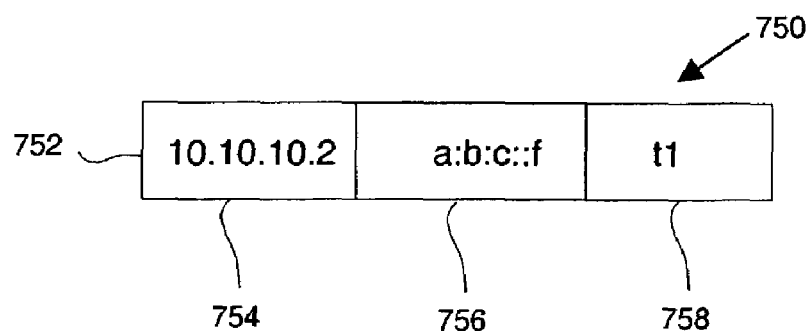
FIG. 7B is a diagrammatic representation of a MAP table in accordance with one embodiment of the present invention.

Any suitable mechanism may be used to track bindings between IPv4 and IPv6 addresses. FIG. 7B is a diagrammatic representation of a map table 750 in accordance with one embodiment of the present invention. As shown, the map table includes one entry 752 although it may include any number of entries. Each entry includes an IPv4 pool address 754, a corresponding IPv6 address 756, and a timer 758. The timer may be used to expunge a binding after a period of idleness. The timer is re-initiated after each use of the binding. In the present example of FIG. 3A, the IPv4 address is 10.10.10.2; the IPv6 address is a:b:c::f; and the timer is set to T1.

A prefix may be used to translate between IPv4 and IPv6 addresses, as well known to those skilled in the art. For the example of FIG. 3B, a prefix is pre-pending to the answer address of the IPv4 DNS response to form an IPv6 response. The prefix, as well as the map table, are later used to translate addresses within data packets.

Figure 8:
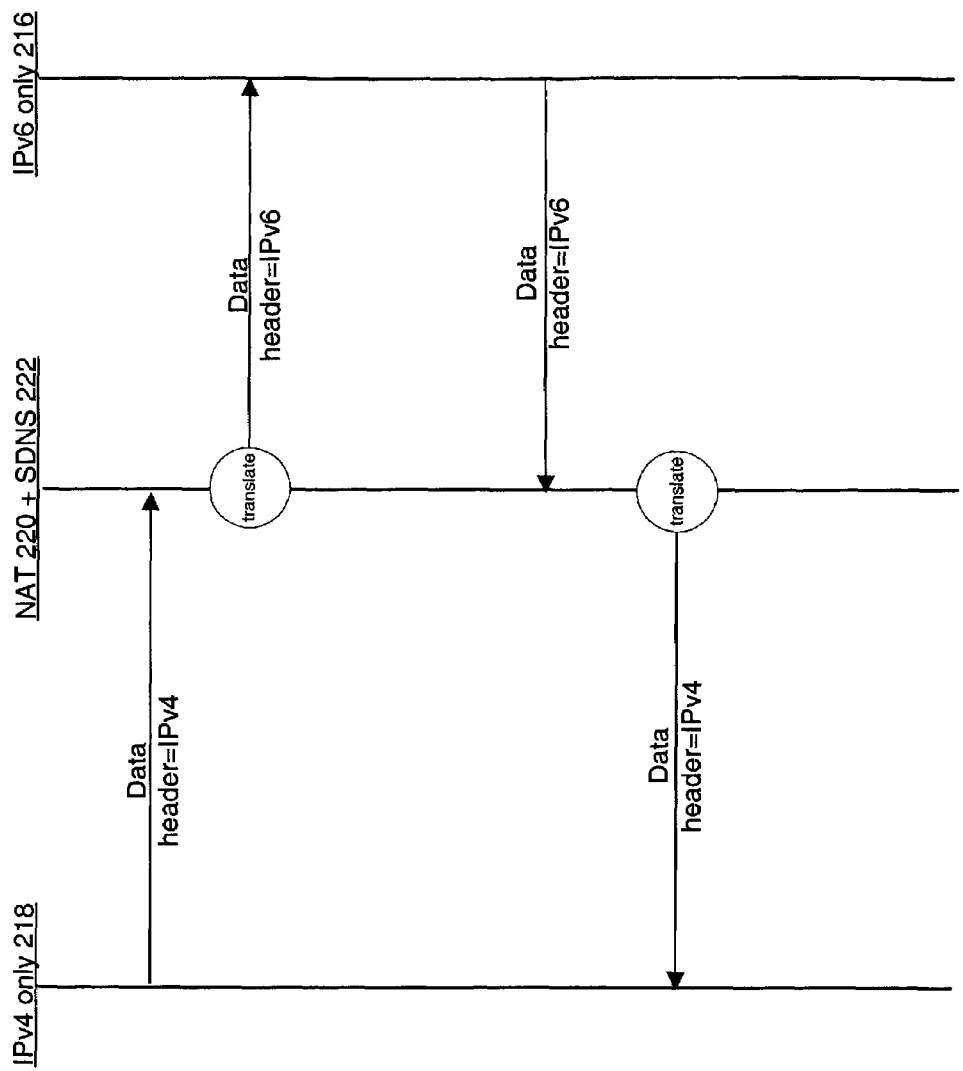
FIG. 8 is a communication diagram illustrating data being sent from the IPv4 only device to the IPv6 only device, and vice versa.

FIG. 8 is a communication diagram illustrating data being sent from the IPv4 only device 218 to the IPv6 only device 216, and vice versa. In the illustrated example, IPv4 device 218 sends data having an IPv4 header to IPv6 device 216 via NAT device 220. The NAT device 220 translates this data so that it has a IPv6 header. Likewise, when IPv6 device 216 sends data an IPv6 header to IPv4 device 218, the NAT device 220 translates the header into an IPv4 header before forwarding the data to IPv4 device 218.

Figure 9:
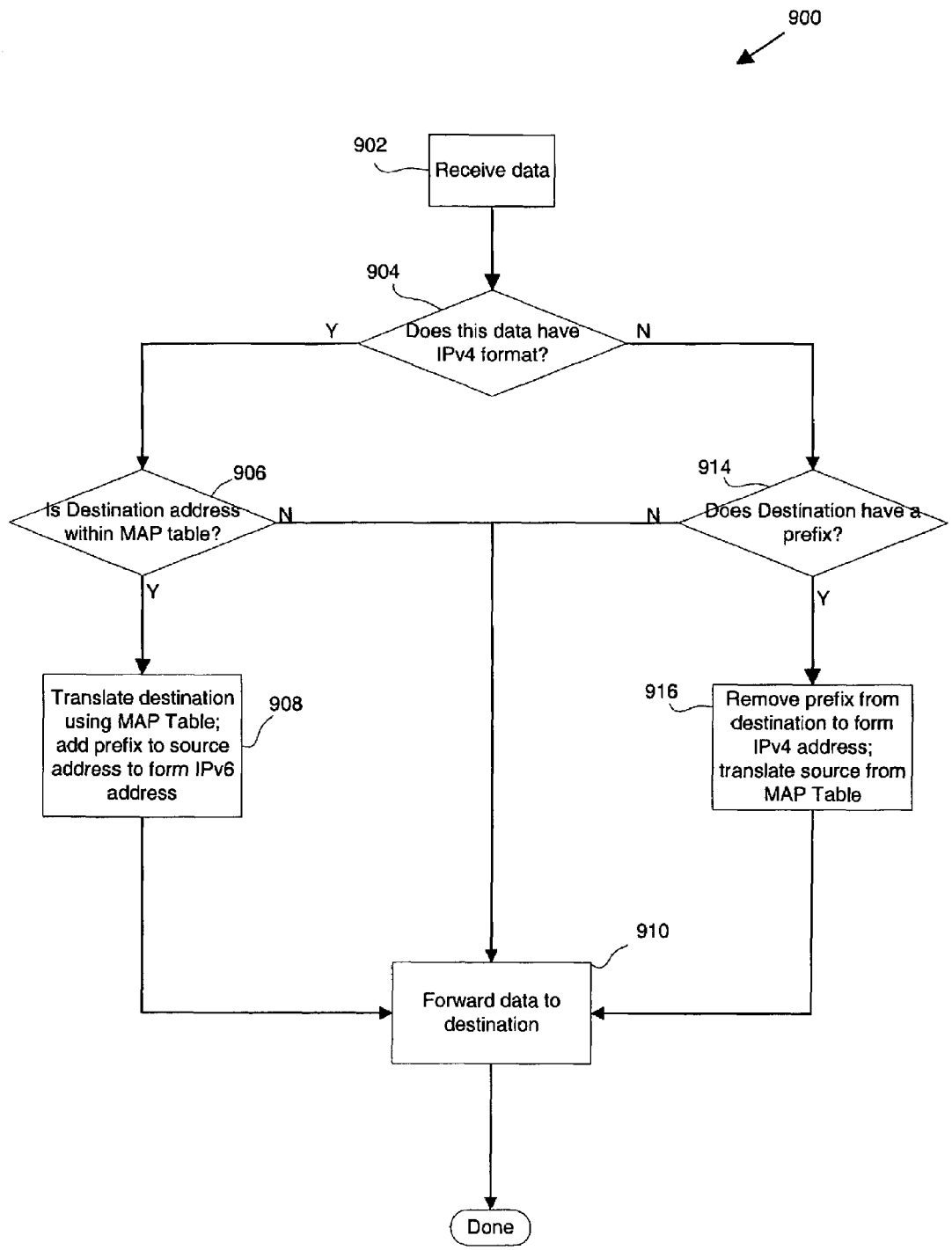
FIG. 9 is a flowchart illustrating a procedure for handling data.

FIG. 9 is a flowchart illustrating a procedure 900 for handling data. Initially, data is received in operation 902. It is then determined whether this data has an IPv4 format in operation 904. Alternatively, it may be determined whether the data has an IPv6 format. If the data has an IPv4 format, it is then determined whether the destination address is within the map table in operation 906. If the destination address is within the map table, the destination is translated using the map table and the pre-configured prefix is added to the source address to form IPv6 addresses in operation 908. Data is then forwarded to the destination in operation 910. If the destination address is not within the map table 906, the data is simply forwarded to the destination without translation.

If the data is in an IPv6 format, it is then determined whether the destination has a prefix in operation 914, if the destination has a prefix, the prefix is removed from the destination address to form an IPv4 address and the source address is translated from the map table in operation 916. The translated data is then forwarded to the destination in operation 910. If the destination address does not have a prefix, the data is merely forwarded to the destination without translation. The procedure then ends.

In certain cases, a tunneling procedure may be implemented before forwarding a packet to its destination. For example, when an IPv4 device sends a packet through an IPv4 LAN having IPv6 sub-networks to an IPv6 device within a WAN network, where the next hop in the WAN network is an IPv4 device, it is currently necessary to tunnel the packet before forwarding it to the IPv6 device.

Additionally, the techniques of the present invention may be easily implemented with inverse DNS queries and responses. Inverse DNS queries are sent to verify the answer address of a particular URL. For example, the answer address is sent in by the DNS client in an inverse format, e.g., the address is flipped. In the example of FIG. 3A, the answer address 10.10.10.2 is sent within an inverse DNS query as 2.10.10.10.in-adr.arpa (where the "in-adr" indicates an inverse format). In preferable embodiments, the Stateful-DNS is also configured to look for the inverse format and obtain the reverse translation address (if necessary) of the reversed query or answer record.

Generally, the techniques for handling DNS queries and responses (as well as for translating addresses and protocols) of the present invention may be implemented on software and/or hardware. For example, it can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the packet processing system (e.g., NAT-PT and Stateful-DNS device) may be implemented on a general-purpose network host machine such as a personal computer or workstation. Further, the invention may be at least partially implemented on a card (e.g., an interface card) for a network device or a general-purpose computing device.

Figure 10:
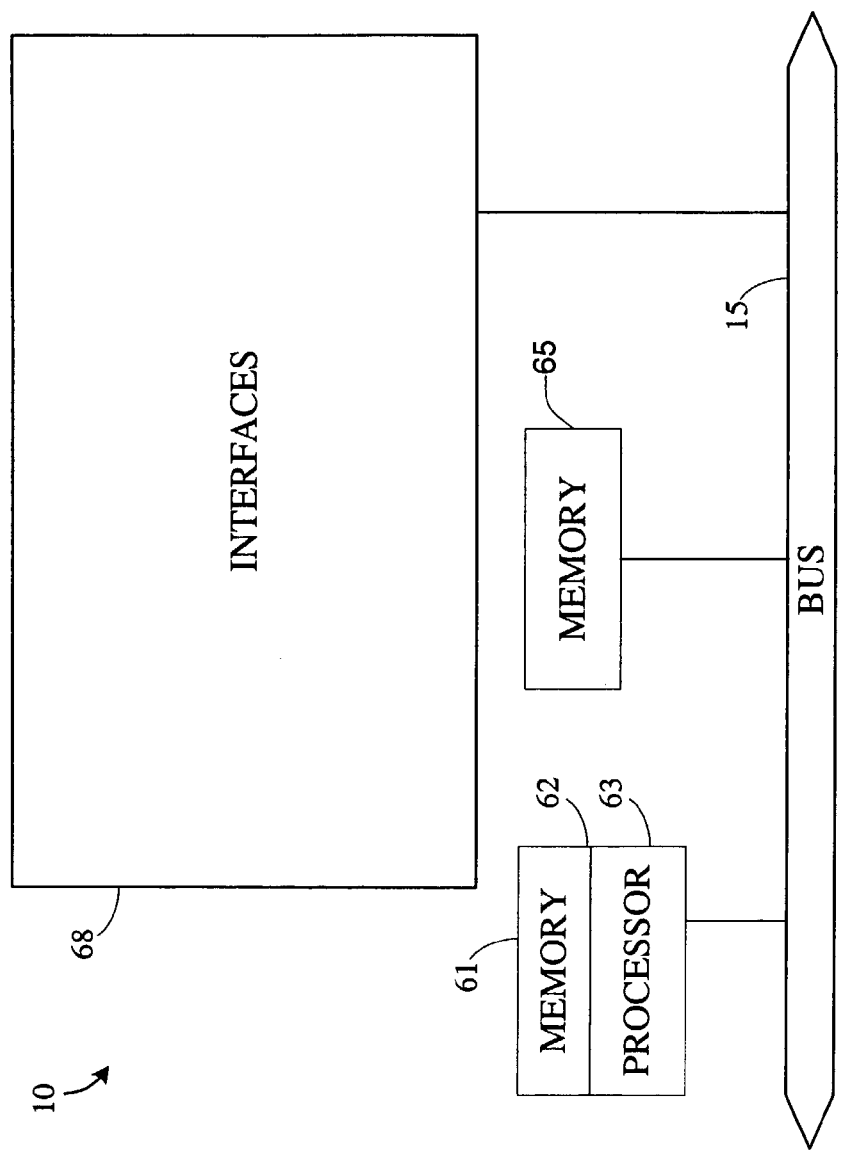
FIG. 10 is a diagrammatic representation of a router in which embodiments of the present invention may be implemented.

Referring now to FIG. 10, a router 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for performing protocol conversions between a first and second protocol (e.g., IPv4 and IPv6), determining whether to forward or hold a DNS response, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 10 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received packets, identifiers to track each flow and the number of such flows, a MAP table, a pool table, connection tables, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method for handling domain name system (DNS) packets, comprising:
    receiving a current DNS response corresponding to a first DNS query that was earlier received and sent by a DNS client or a second DNS query that is a translation of the first DNS query, the current DNS response having a first IPv4 or IPv6 protocol;
    if the current DNS response does not require translation and does not have a null answer, forwarding the current DNS response to the DNS client;
    if the current DNS response requires translation, forwarding a translation of the current DNS response to the DNS client only if a subsequent DNS response, which does not have a null answer and corresponds to the first DNS query, is not received before expiration of a predetermined time period; and
    if a subsequent DNS response, which does not have a null answer and corresponds to the first DNS query, is received after receiving the current DNS response before expiration of the predetermined time period, forwarding the subsequent DNS response to the DNS client.

2. A method as recited in claim 1, wherein the first DNS query has an IPv4 or an IPv6 first protocol, the method further comprising:
    when the first protocol of the first DNS query is IPv4, translating the first DNS query into a second DNS query having a second protocol that is IPv6 and forwarding the first DNS query having the IPv4 first protocol to an IPv4 DNS server and the second DNS query having the IPv6 protocol to an IPv6 DNS server; and
    when the first protocol of the first DNS query is IPv6, translating the first DNS query into a second DNS query having a second protocol that is IPv4 and forwarding the first DNS query having the IPv6 first protocol to an IPv6 DNS server and the second DNS query having the IPv4 protocol to an IPv4 DNS server.

3. A method as recited in claim 2, further comprising:
    storing an entry within a connection table for the first DNS query, wherein the entry for the first DNS query includes an identifier for the first DNS query and a field for holding the first received response,
    when the current DNS response is received, determining whether the entry for the first DNS query is still present based on an identifier of the current DNS response matching the identifier of the entry; and
    dropping the current DNS response when the entry for the first DNS query is not present.

4. A method as recited in claim 3, wherein the identifier of the entry includes an IP source address, DNS query identifier, and source port value from the first DNS query and the identifier of the current response includes an IP destination address, DNS response identifier, and destination port of the current DNS response.

5. A method as recited in claim 4, wherein the current DNS response requires translation when its first protocol differs from a protocol of the IP source address of the connection table entry for the first DNS query.

6. A method as recited in claim 4, wherein the connection table entry for the first DNS query also includes a timer that is initiated upon creation of the entry, and wherein expiration of the predetermined time period is an expiration of the timer of the connection table entry.

7. A method as recited in claim 4, further comprising flushing the connection table entry when the current or subsequent DNS response is forwarded to the DNS client or the predetermined time period expires.

8. A method as recited in claim 1, further comprising:
 if the current DNS response has a null answer and requires translation, forwarding a translation of the current DNS response to the DNS client only if a subsequent DNS response, which corresponds to the first DNS query, is not received before expiration of the predetermined time period; and
 if the current DNS response has a null answer and a subsequent DNS response, which has a null answer and corresponds to the first DNS query, is received before expiration of the predetermined time period, forwarding the subsequent DNS response to the DNS client.

9. A computer system operable to handle domain name system (DNS) packets, the computer system comprising:
 one or more processors;
 one or more memory, wherein at least one of the processors and memory are configured for:
  receiving a current DNS response corresponding to a first DNS query that was earlier received and sent by a DNS client or a second DNS query that is a translation of the first DNS query, the current DNS response having a first IPv4 or IPv6 protocol;
  if the current DNS response does not require translation and does not have a null answer, forwarding the current DNS response to the DNS client;
  if the current DNS response requires translation, forwarding a translation of the current DNS response to the DNS client only if a subsequent DNS response, which does not have a null answer and corresponds to the first DNS query, is not received before expiration of a predetermined time period; and
  if a subsequent DNS response, which does not have a null answer and corresponds to the first DNS query, is received after receiving the current DNS response before expiration of the predetermined time period, forwarding the subsequent DNS response to the DNS client.

10. A computer system as recited in claim 9, wherein the first DNS query has an IPv4 or an IPv6 first protocol, wherein the at least one of the processors and memory are further configured for:
 when the first protocol of the first DNS query is IPv4, translating the first DNS query into a second DNS query having a second protocol that is IPv6 and forwarding the first DNS query having the IPv4 first protocol to an IPv4 DNS server and the second DNS query having the IPv6 protocol to an IPv6 DNS server; and
 when the first protocol of the first DNS query is IPv6, translating the first DNS query into a second DNS query having a second protocol that is IPv4 and forwarding the first DNS query having the IPv6 first protocol to an IPv6 DNS server and the second DNS query having the IPv4 protocol to an IPv4 DNS server.

11. A computer system as recited in claim 9, wherein the at least one of the processors and memory are further configured for:
 if the current DNS response has a null answer and requires translation, forwarding a translation of the current DNS response to the DNS client only if a subsequent DNS response, which corresponds to the first DNS query, is not received before expiration of the predetermined time period; and
 if the current DNS response has a null answer and a subsequent DNS response, which has a null answer and corresponds to the first DNS query, is received before expiration of the predetermined time period, forwarding the subsequent DNS response to the DNS client.

12. A computer system as recited in claim 9, wherein the at least one of the processors and memory are further configured for:
 storing an entry within a connection table for the first DNS query, wherein the entry for the first DNS query includes an identifier for the first DNS query and a field for holding the first received response,
 when the current DNS response is received, determining whether the entry for the first DNS query is still present based on an identifier of the current DNS response matching the identifier of the entry; and
 dropping the current DNS response when the entry for the first DNS query is not present.

13. A computer system as recited in claim 12, wherein the identifier of the entry includes an IP source address, DNS query identifier, and source port value from the first DNS query and the identifier of the current response includes an IP destination address, DNS response identifier, and destination port of the current DNS response.

14. A computer system as recited in claim 13, wherein the current DNS response requires translation when its first protocol differs from a protocol of the IP source address of the connection table entry for the first DNS query.

15. A computer system as recited in claim 13, wherein the connection table entry for the first DNS query also includes a timer that is initiated upon creation of the entry, and wherein expiration of the predetermined time period is an expiration of the timer of the connection table entry.

16. A computer system as recited in claim 13, wherein at least one of the processors and memory are further adapted for flushing the connection table entry when the current or subsequent DNS response is forwarded to the DNS client or the predetermined time period expires.

17. A computer program product for handling domain name system (DNS) packets, the computer program product comprising:
 at least one computer readable medium;
 computer program instructions stored within the at least one computer readable product configured for:
  receiving a current DNS response corresponding to a first DNS query that was earlier received and sent by a DNS client or a second DNS query that is a translation of the first DNS query, the current DNS response having a first IPv4 or IPv6 protocol;
  if the current DNS response does not require translation and does not have a null answer, forwarding the current DNS response to the DNS client;
  if the current DNS response requires translation, forwarding a translation of the current DNS response to the DNS client only if a subsequent DNS response, which does not have a null answer and corresponds to the first DNS query, is not received before expiration of a predetermined time period; and if a subsequent DNS response, which does not have a null answer and corresponds to the first DNS query, is received after receiving the current DNS response before expiration of the predetermined time period, forwarding the subsequent DNS response to the DNS client.

18. A computer program product as recited in claim 17, wherein the first DNS query has an IPv4 or an IPv6 first protocol, and wherein the computer program instructions stored within the at least one computer readable product are further configured for:
- when the first protocol of the first DNS query is IPv4, translating the first DNS query into a second DNS query having a second protocol that is IPv6 and forwarding the first DNS query having the IPv4 first protocol to an IPv4 DNS server and the second DNS query having the IPv6 protocol to an IPv6 DNS server; and
- when the first protocol of the first DNS query is IPv6, translating the first DNS query into a second DNS query having a second protocol that is IPv4 and forwarding the first DNS query having the IPv6 first protocol to an IPv6 DNS server and the second DNS query having the IPv4 protocol to an IPv4 DNS server.

19. A computer program product as recited in claim 18, wherein the computer program instructions stored within the at least one computer readable product are further configured for:
- storing an entry within a connection table for the first DNS query, wherein the entry for the first DNS query includes an identifier for the first DNS query and a field for holding the first received response,
- when the current DNS response is received, determining whether the entry for the first DNS query is still present based on an identifier of the current DNS response matching the identifier of the entry; and
- dropping the current DNS response when the entry for the first DNS query is not present.

20. A computer program product as recited in claim 19, wherein the identifier of the entry includes an IP source address, DNS query identifier, and source port value from the first DNS query and the identifier of the current response includes an IP destination address, DNS response identifier, and destination port of the current DNS response.

21. A computer program product as recited in claim 20, wherein the current DNS response requires translation when its first protocol differs from a protocol of the IP source address of the connection table entry for the first DNS query.

22. A computer program product as recited in claim 20, wherein the connection table entry for the first DNS query also includes a timer that is initiated upon creation of the entry, and wherein expiration of the predetermined time period is an expiration of the timer of the connection table entry.

23. A computer program product as recited in claim 20, wherein the computer program instructions stored within the at least one computer readable product further configured for flushing the connection table entry when the current or subsequent DNS response is forwarded to the DNS client or the predetermined time period expires.

24. A computer program product as recited in claim 17, wherein the computer program instructions stored within the at least one computer readable product are further configured for:
- if the current DNS response has a null answer and requires translation, forwarding a translation of the current DNS response to the DNS client only if a subsequent DNS response, which corresponds to the first DNS query, is not received before expiration of the predetermined time period; and
- if the current DNS response has a null answer and a subsequent DNS response, which has a null answer and corresponds to the first DNS query, is received before expiration of the predetermined time period, forwarding the subsequent DNS response to the DNS client.

25. An apparatus for handling domain name system (DNS) packets, comprising:
- means for receiving a current DNS response corresponding to a first DNS query that was earlier received and sent by a DNS client or a second DNS query that is a translation of the first DNS query, the current DNS response having a first IPv4 or IPv6 protocol;
- means for if the current DNS response does not require translation and does not have a null answer, forwarding the current DNS response to the DNS client;
- means for if the current DNS response requires translation, forwarding a translation of the current DNS response to the DNS client only if a subsequent DNS response, which does not have a null answer and corresponds to the first DNS query, is not received before expiration of a predetermined time period; and
- means for if a subsequent DNS response, which does not have a null answer and corresponds to the first DNS query, is received after receiving the current DNS response before expiration of the predetermined time period, forwarding the subsequent DNS response to the DNS client.

* * * * *